(12) United States Patent
M'Raihi et al.

(10) Patent No.: US 6,459,791 B1
(45) Date of Patent: Oct. 1, 2002

(54) PUBLIC KEY CRYPTOGRAPHY METHOD

(75) Inventors: David M'Raihi; David Naccache, both of Paris (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/194,980

(22) PCT Filed: Jun. 5, 1996

(86) PCT No.: PCT/FR96/00840

§ 371 (c)(1),
(2), (4) Date: Aug. 24, 1999

(87) PCT Pub. No.: WO97/47110

PCT Pub. Date: Dec. 11, 1997

(51) Int. Cl.[7] ................................................. H04L 9/30
(52) U.S. Cl. .......................................................... 380/30
(58) Field of Search ............................ 380/30, 28, 44; 708/270, 277, 490

(56) References Cited

U.S. PATENT DOCUMENTS 5,204,901 A * 4/1993 Hershey et al. ............. 380/285
5,483,597 A * 1/1996 Stern ............................ 380/30

OTHER PUBLICATIONS

Proceedings IEEE 1989 Custom I.C. Circuit Conf. May 1989, pp. 12.3/I–J.
Electronics Letters Aug. 17, 1989; Stevenage U.K. vol. 25, No. 17, pp. 1172–2.
Advances in Cryptology. Auscrypt '92; Australia Dec. 13–16, 1992, pp. 447–456.

* cited by examiner

*Primary Examiner*—Matthew Smithers
(74) *Attorney, Agent, or Firm*—Roland Plottel

(57) ABSTRACT

The invention features a public key cryptography method based on the discrete logarithm which computes a value $G^k \bmod p$. Two solutions are proposed to reduce the number of multiplications, one consisting in generating "hollow" k exponents with a few bits of value 1, but of sufficient length to maintain the total security of the system, and the other consisting of performing calculations of the powers of g in parallel while combining the exponents with each other in order to prevent repeating the same power computations twice for a given exponent. The invention is useful for generating digital signatures, authentication and encryption.

5 Claims, 4 Drawing Sheets

PUBLIC KEY CRYPTOGRAPHY METHOD

Figure 1:
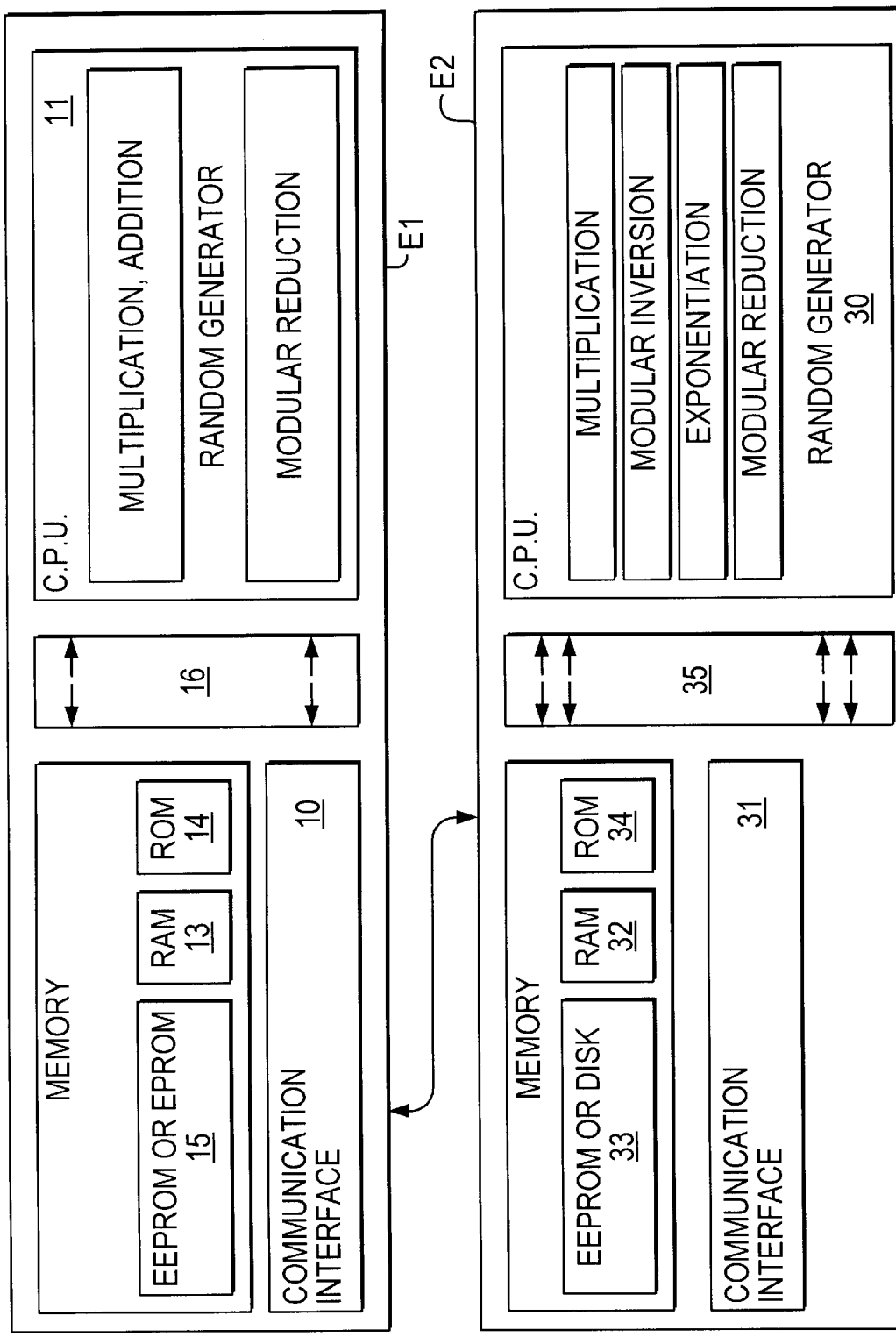

The object of the present invention is a cryptography method of the so-called public key type based on the discrete logarithm using the calculation of a modulo p quantity.

It finds an application in the generation of digital message signatures, in an authentication session between two entities or in the encoding of data.

In such procedures, security is based on the extreme difficulty that there is in reversing certain functions and particularly the discrete logarithm.

This problem consists, given the mathematical relationship $y=g^x$ modulo p, which will be denoted hereinafter $y=g^x \bmod p$ (which means y is the remainder of the division of $g^x$ by p), of finding x when p, g and y are known. This problem is impossible to resolve, in the current state of knowledge, as soon as the size of p reaches or exceeds 512 bits and the size of x reaches or exceeds 128 bits.

In such systems, there is in general an authority which supplies the number p of large size, constituting the modulus. The authority also chooses an integer g, referred to as the base, such that the set generated by g, i.e. the set formed by the numbers $g^x \bmod p$) for x belonging to the interval $[0, p-1]$, is a subset of maximum size, at least $2^{128}$.

The parameters p and g are said to be "public", i.e. they are supplied by the authority to all the users attached to this authority.

According to certain variants, these parameters are chosen individually by each user and, in this case, form an integral part of its public key.

A major drawback of the use of cryptographic systems lies in the need to have relatively large calculation and storage means because of the complex calculations which are performed.

This is because the calculation of the quantity $g^k \bmod p$ consists in performing modular multiplications and this is expensive in calculation time and memory space. In simple electronic devices using only standard microprocessors, this type of operation can scarcely be performed.

For electronic devices having a specialised processor for this type of calculation, it is in spite of everything desirable to limit the calculation time and memory space necessary for the intermediate results.

This is because calculating the quantity $g^k \bmod p$ is in general relatively expensive using the conventional method of "square-multiply", known by the English abbreviation SQM, since it is equivalent on average to $3/2 \, \text{Log}^2(p)$ multiplications.

According to this method all the powers of g are calculated, i.e. all the squares: $g^0, g^1, g^2 \ldots g_n$, when k is n bits long, since the required multiplications between these powers are performed (for example $g^{17}=g^1 \cdot g^{16}$)

According to the simple "square-multiply" method, $g^k$ requires n/2 multiplications and n squares.

Where N signatures are to be supplied on a single occasion, $Ng^k$ is produced, and then a parallel calculation is performed.

The parallel "square-multiply" method requires $N \times n/2$ multiplications and n squares.

A method proposed by E. BRICKEL et al, referred to by the abbreviation BGKW, makes it possible to reduce the number of multiplications in the case of the square-multiply method but introduces a requirement to store numerous precalculated constants and therefore the need to have a highly disadvantageous quantity of storage memories.

Introducing a parallel calculation of N values into this method entails the use of numerous registers for keeping the intermediate results.

This method therefore becomes much more constraining when there is a situation where it is a case of generating a large number of signatures in a very short time since in this case parallel calculation is introduced.

The object of the present invention is to remedy all these drawbacks. It affords a solution, flexible and inexpensive in calculation time and memory space, to the implementation of cryptographic algorithms for all cryptography systems and in particular by means of portable appliances of the microprocessor chip card type.

According to a first object of the invention, the proposed cryptography method reduces the number of modular multiplications so that savings in calculation times are obtained of 15 to 40% and more depending on the cryptography schemes used (Schnorr or El Gamal).

According to the invention, two solutions are proposed in order to reduce the number of multiplications, one consisting of generating "hollow" exponents k with few bits at 1, but of sufficient length to keep all the security for the system, and the other consisting in performing the calculations of the powers of g in parallel whilst combining the exponents with each other so as not to perform the same power calculation twice for a given exponent.

An object of the invention is more particularly a public key cryptography method based on the discrete logarithm using the calculation of the quantity $q^k \bmod p$ where p is a prime number referred to as the modulus, k a random number normally of length n bits and g an integer referred to as the base, in which an entity E performs authentication and/or signature and/or encoding operations, comprising exchanges of signals with another entity in which this quantity acts, characterised in that it includes the following steps for the entity:

generating a random exponent k of length N bits, N being equal to n+b bits, calculating the Hamming weighting C of this exponent and comparing it with a value h fixed in advance, checking whether the random value k fulfils the condition $C \geq h$ rejecting the random value k where the Hamming weighting is less than h and recommencing the generation of new exponents until an exponent satisfying this condition is obtained, or keeping this value in the contrary case, calculating the expression gkmodp from the kept value, using this expression in an exchange of electronic signals with the other entity.

Another object of the invention is a public-key cryptography method based on the discrete logarithm using the calculation of the quantity $g^k \bmod p$ where p is a prime number referred to as the modulus, k a random number normally of length n bits and g an integer referred to as the base, in which an entity E performs authentication and/or signature and/or encoding operations, comprising exchanges of signals with another entity in which several quantities of this type act, characterised in that it includes the following steps for the entity:

generating a set of random exponents $k_j$ of n bits of weighting $a_i$ expressed by the expression:

$$k_j = \Sigma a_i 2^i$$

calculating in parallel the powers of $_g 2^i$ whilst combining the exponents so that the powers of g already calculated for an exponent serve for other exponents in which they act, for each given $k_j$, calculating the powers of g not yet calculated and grouping together all these powers in order to obtain the required expression $g^{kj}$modp, using these expressions in an exchange of signals with the other entity.

According to a first embodiment, these steps of calculating in parallel and grouping together include the following operations:

combining the exponents in pairs in order to obtain exponents $k_c$ which are a reflection of their common parts and reiterating the combinations on the combination result obtained, calculating quantities $G_{kc}$ for each value of $k_c$ such that:

$$G_{kc} = g^{kc} \bmod p$$

combining an exponent $k_j$ with the exponent $k_c$ obtained for the combination to which this exponent belongs so as to eliminate the common parts and keep only the different parts, defining exponents $k'_j$ which are a reflection of the different parts between a given exponent $k_j$ and a given exponent $k_c$, calculating quantities $G_{k'j}$ such that:

$$G_{k'j} = g^{k'j} \bmod p$$

determining the expressions $G_{kj}$modp by performing multiplications between the quantities $G_{kc}$ obtained at each iteration.

In a second embodiment, the steps of calculating in parallel and grouping together include the following operations:

combining the exponents together so as to form all the subsets of possible combinations of exponents having common parts, defining exponents $k_c$ which are a reflection of the common parts, for each subset of combinations such that the non-nil bits of given weighting correspond to the non-nil bits of the same weighting of the combination under consideration, calculating quantities $G_{kc}$ for each value of $k_c$ such that:
$G_{kc} = g^{kc}$modp combining each exponent $k_j$ with all the exponents $k_c$ obtained for each subset of combinations to which this exponent $k_j$ belongs so as to eliminate the common parts and keep only the different parts, defining exponents $k'_j$ which are a reflection of different parts between a given exponent $k_j$ and a given exponent $k_c$, calculating quantities $G_{k'j}$ such that:

$$G_{k'j} = g^{k'j} \bmod p$$

determining the expressions $g^{kj}$modp by performing a multiplication between the quantities $G'_{kj}$ and $G_{ko}$ for each $k_j$.

According to another object of the invention, the combinations making it possible to obtain the common parts between the exponents are made by AND logic functions.

According to another object of the invention, the combinations for obtaining the different parts are effected by exclusive-OR logic functions.

Figure 2:
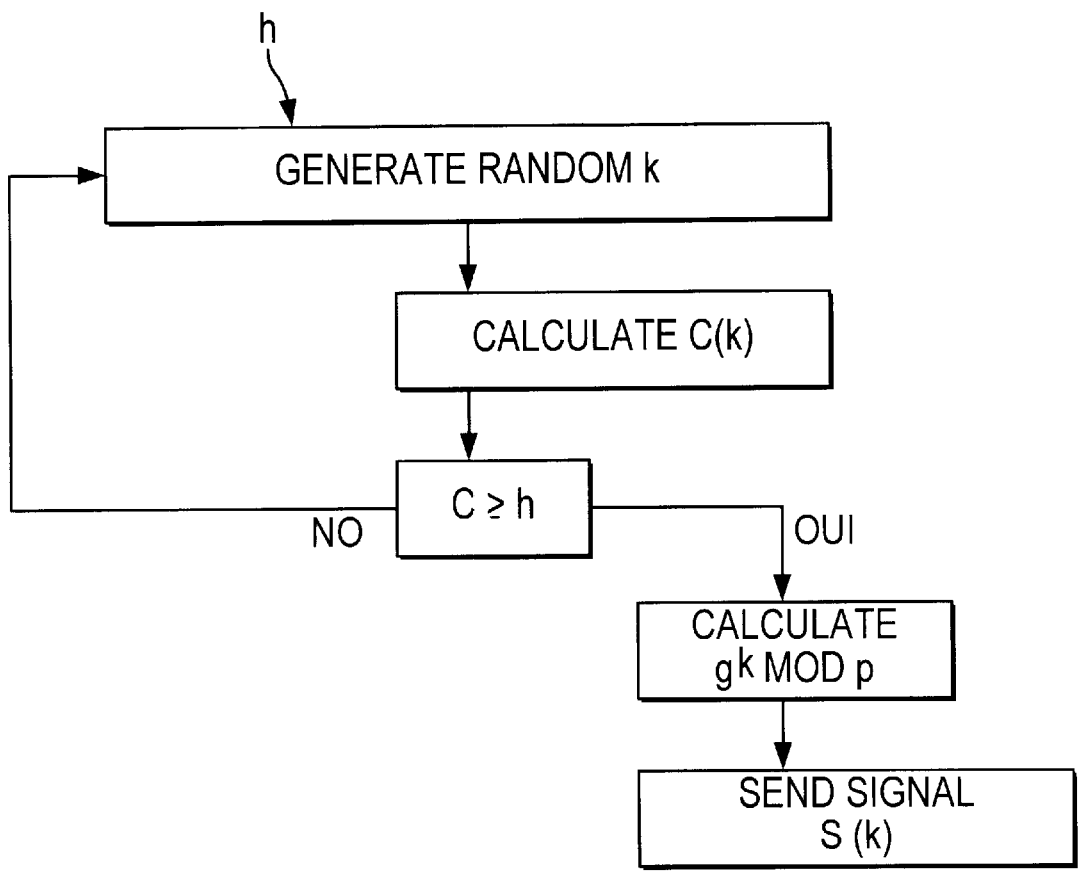
Figure 3:
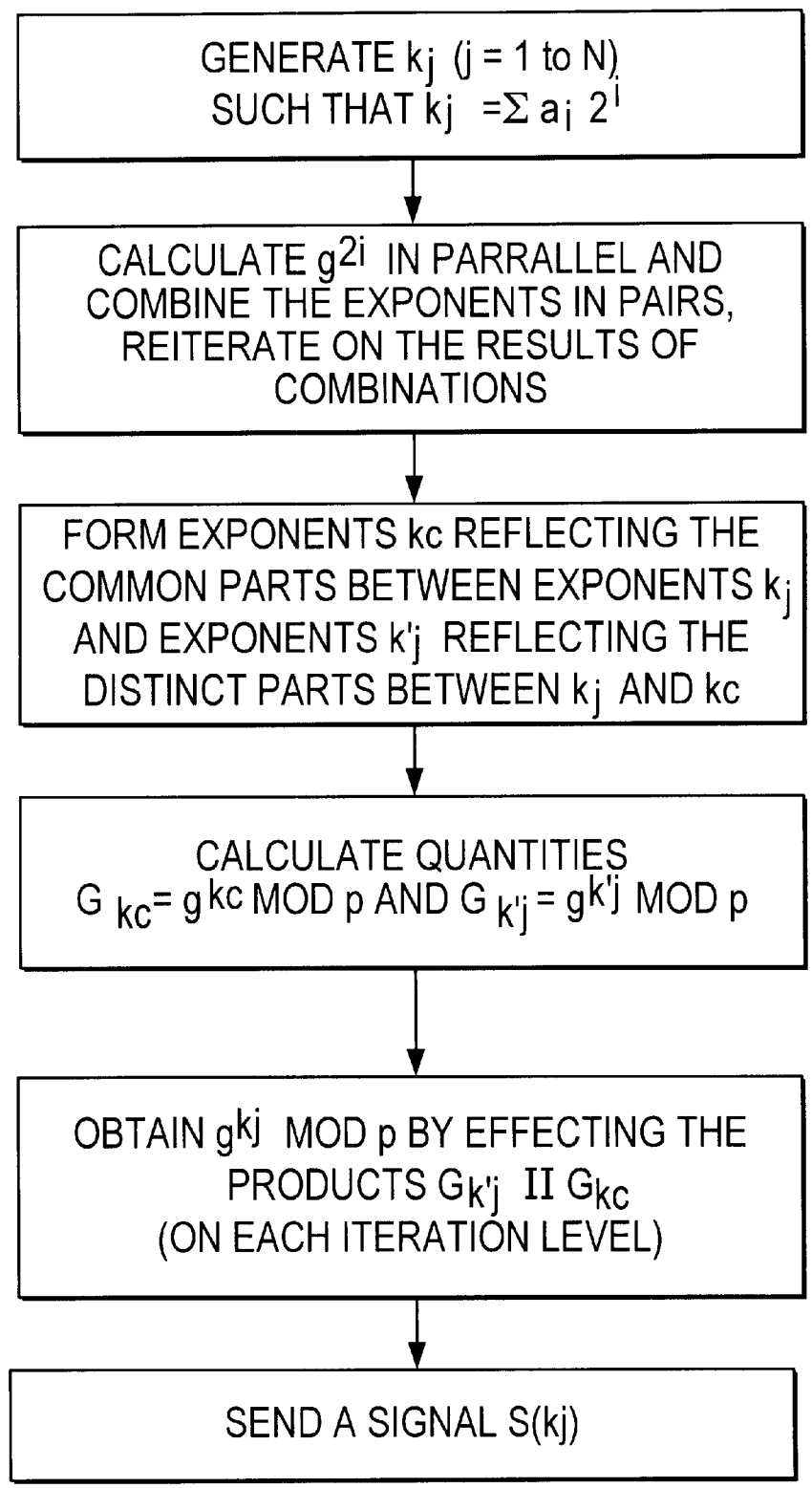
Figure 4:
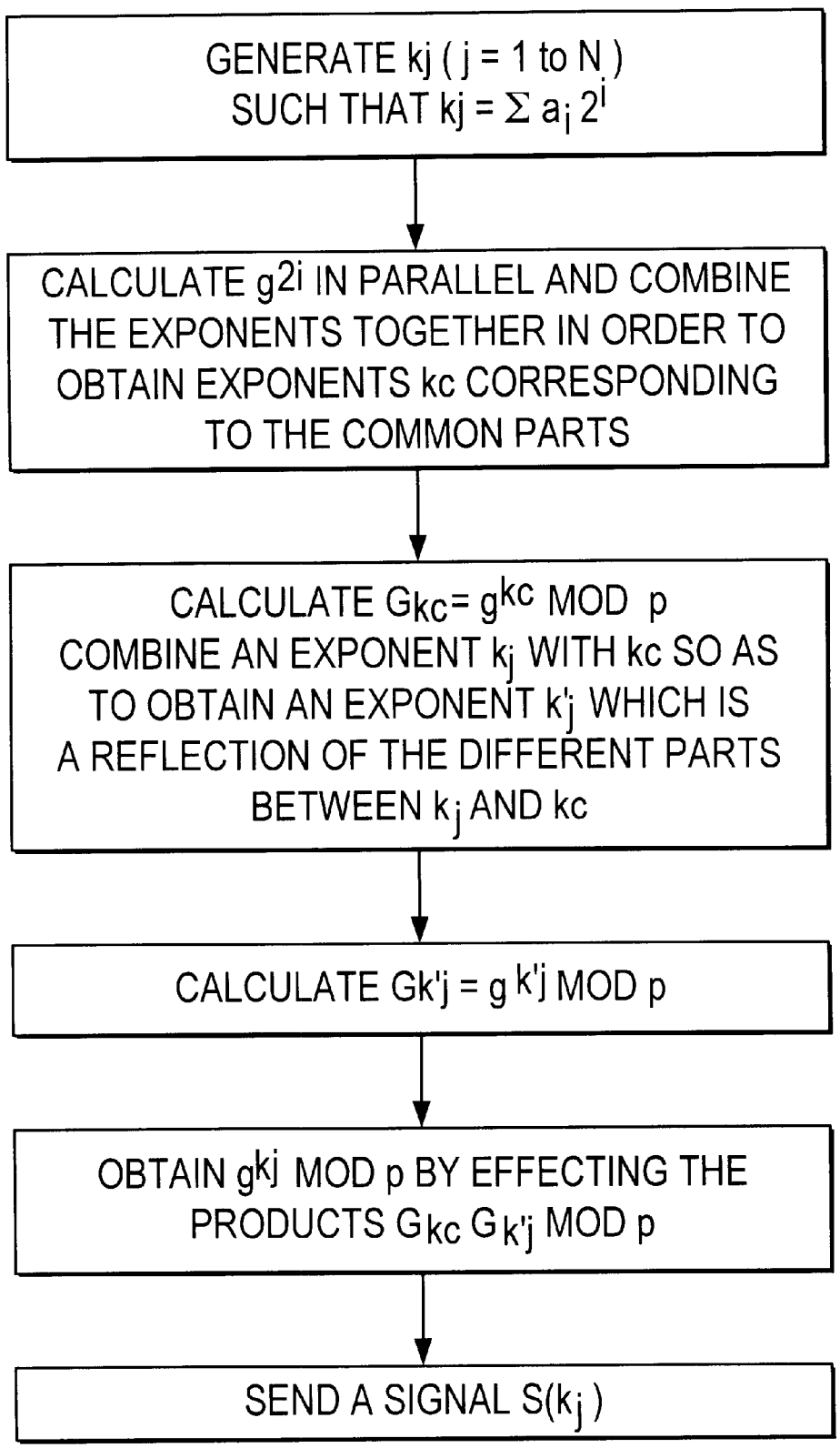

Other particularities and advantages of the invention will emerge from a reading of the description made, which is given by way of illustrative and non-limitative example with regard to the drawings, which depict:

FIG. 1, an outline diagram of a system able to implement the invention,

FIG. 2, a functional diagram depicting the essential steps of the method in a first application, FIG. 3, a functional diagram depicting the essential steps of the method in a second application according to a first embodiment, FIG. 4, a functional diagram, depicting the essential steps of the method in the second application, according to a second embodiment.

FIG. 1 depicts an outline diagram of a system implementing the cryptography method which is the object of the invention.

This system is formed by an entity E1 wishing to effect exchanges of electronic signals with at least one other entity E2. The two entities are provided respectively with a processing unit (CPU) 11, 30, a communication interface, a random access memory (RAM) 13, 32 and/or a read only memory (ROM) 14, 34 and/or a non-volatile writable or rewritable memory (EPROM or EEPROM) 15, 32 and an address, data and control bus 16, 35.

The processing control unit and/or the ROM contain programs or calculation resources corresponding to the execution of the calculation steps taking part in the method which is the object of the invention, i.e. during an authentication session or during the generation of an electronic signature or during the encoding of electronic signals to be transmitted to the other entity.

The processing unit or the ROM have the necessary resources for multiplications, additions and modular reductions.

Just as the processing unit and/or the ROM have the used cryptography functions proper to each cryptography algorithm and the parameters g and p. The exponents $k_j$ can be loaded in advance into a rewritable memory by the authority or generated as needed from a random generator and a secret source random value ko. The entity E1 also has a secret key x.

The invention applies particularly to the cryptography system set up in the banking field where a high level of security is required during transactions performed on accounts. It is also the case where it is wished to authenticate the sending of messages transmitted in the form of electronic signals from another entity. It is also the case where there is a need to sign messages during exchanges of signals with another entity.

In practice, the entity wishing to perform a transaction may for example be an integrated circuit card such as a chip card, and the destination entity will then be a bank terminal.

The remainder of the description will be given in the context of the application of the method to the signing of digital methods, it being understood of course that the invention applies to any cryptography system based on a discrete algorithm.

The method according to the invention proposes a first solution for considerably reducing the number of multiplications particularly adapted to the case where there is an environment where the memory space is small.

In this case, the principle is to produce exponents $k_j$ which are "hollow" in that the Hamming weighting will be chosen as small as possible, whilst of course preserving the random character of these exponents.

To do this, the method consists of generating exponents $k_j$ either as needed or prior to any exchange. Naturally, in this case, they will be stored in memory. The exponents generated do not have a length of n bits but a greater length n+b bits and fulfilling a condition defined hereinafter.

When an exponent k of n+b bits is generated, the method next consists in calculating the Hamming weighting C of this exponent and then comparing it with a value h fixed in advance.

If at the end of the comparison C≧h, the exponent is retained and will be used by the entity, which will then calculate the expression $g^k \bmod p$ and use this expression in the sending of digital signals in which this expression will be used as a signature for example.

Where the parameter C does not fulfil the required condition, the corresponding exponent k is rejected, a new exponent is generated, and the condition verification step is recommenced until an exponent k fulfilling this condition is obtained.

This solution thus makes it possible to have to perform fewer multiplications whilst preserving the same security level as if there were exponents of smaller size.

According to a particular example, making it possible to reduce the number of multiplications to the maximum possible extent, C will be chosen equal to h.

In practice, for an exponent of size n+b bits (with $n=\log_2 p$) whose Hamming weighting is h, in order to have the same number of combinations as when the exponent is of n bits, then the following relationships must be verified:

$$2^n \leq C^h_{n+b}$$

and (N+b)/2+h≦n (a condition which makes it possible to reduce the number of calculations to be performed)

i.e. $2^n \leq (n+b)!/(n+b-h)!h!$ and b+2h≦n

The numbers b and h which are chosen are obtained by resolving this double inequality for a given n (n=160 for example).

By way of illustration, the results of the method according to the invention were compared with the known methods.

In the case of the Schnorr algorithm where n=160 bits, and in the case of the El Gamal algorithm where n=512 bits. These results are indicated in the following table.

| Variant effort | Schnorr | El Gamal Calculation time | El Gamal Memory space |
| --- | --- | --- | --- |
| multiplications | 62 (h) | 187 (h) | 199 (h) |
| SQUARE | 87 (b = 15) | 279 (b = 52) | 273 (b = 35) |
| EFFORT | 149 | 469 | 472 |
| GAIN | 6.8% | 9.4% | 7.8% |

The constraint put on the signature space covered by exponents of n bits can be reduced by a factor α depending on the security level desired.

The parameters n, h and b must then fulfil condition (1)

$$2^{n-\alpha} \leq (n+b)!/(n+b-h)!h! \qquad (1)$$

whilst keeping the possibility of generating the same signatures from different random values of size (n+b) bits.

In practice $2^{80}$ is enough to counter the different possible attacks and therefore n−α=100 is an entirely acceptable value.

| Variant effort | Hollow exponent calculation time | Hollow exponent memory space | Simple square-multiply |
| --- | --- | --- | --- |
| multiplications | 37 (h) | 49 (h) | n/2 |
| squares | n/2 + 7 (b = 14) | n/2 + 2 (b = 4) | n/2 |
| total | n/2 + 44 | n/2 + 51 | n |

This variant embodiment is even more interesting since the costs (and calculation times) of a square is often less than that of a modular multiplication.

In general there is obtained:

s/2≦m≦s, s being the number of squares to be calculated and m the number of multiplications, the two extreme cases being m=s and m=2s.

The comparative results for these two extreme cases have been shown in the following table:

| variant effort | hollow exponent calculation time | hollow exponent memory space | simple square-multiply | GAIN |
| --- | --- | --- | --- | --- |
| Schnorr (m = 2s) | 124 | 131 | 180 | 22.5% |
| El Gamal (m = 2s) | 300 | 307 | 512 | 41% |
| Schnorr (m = s) | 204 | 211 | 240 | 15% |
| El Gamal (m = s) | 556 | 563 | 728 | 24% |

It is found that the gain obtained when the method is applied to the Schnorr and El Gamal schemes is very high compared with the simple square-multiply method and even where it is considered that the cost of a square is the same as that of a multiplication.

According to another embodiment, the method can be applied particularly to systems which have no particular constraint concerning the memory space.

In this embodiment, the different powers of g are calculated in parallel so as to calculate the squares only once, whilst combining the exponents in order not to make the same calculations several times.

In order to understand the invention clearly, a description will be given of the case in which the calculation of two powers has been performed.

Let $k_j = \Sigma a_i 2^i$, kj being drawn randomly (i.e. generated from a random generator)

let $k_k = k_j = \Sigma b_i 2^i$

According to the method the exponents $k_j$ and $k_k$ are combined so as to define an exponent $k_c$ such that:

$k_c = \Sigma a_i b_i 2^i$ reflects the common parts between $k_j$ and $k_k$. The coefficients $a_i$ are either 1 or 0.

The exponent $k_c$ corresponds to the common part of the exponents $k_j$ and $k_k$ i.e. if $k_j = 1 \times 2^{10} + \ldots + 0 + 1 \times 2^0$ and $k_k = 1 \times 2^{10} + 0 + \ldots + 1 \times 2^0$ $k_c = 1 \times 2^{10} + 0 + \ldots + 1 \times 2^0$.

According to the method the exponent k denoted $k_c$ is therefore determined in this way, by means of a AND logic function.

Next a second combination is performed, consisting in determining the distinct parts between the exponent $k_j$ and the exponent $k_c$. The distinct parts between the exponent $k_k$ and the exponent $k_c$ are also sought.

These combinations which are produced for exclusive ORs will be denoted $k_j \oplus k_c$ and $k_k \oplus k_c$.

The following quantities are calculated in parallel:

$$G_{kj} = g^{kj \oplus kc} \bmod p$$

$$G_{kk} = g^{kk \oplus kc} \bmod p$$

$$G_{kc} = g^{kc} \bmod p$$

In order to obtain $g^{jk} \bmod p$ and $G^{kk} \bmod p$ it suffices to perform the operations:

1) $G_{kj} \times Gk_c \bmod p$
2) $Gk_k \times Gk_o \bmod p$

When there are, as in the example which has just been given, two powers, on average approximately 3n/4 multiplications are carried out instead of n multiplications. The gain is 25%.

The method according to the invention can be generalised to a larger number of combinations of exponents. This generalisation can also be set up according to two embodiments illustrated by the functional diagrams in FIGS. 3 and 4.

In this case, the invention applies particularly to the cases where there is a need to generate a large number of signatures.

According to the first embodiment, combinations of exponents in pairs are effected according to a tree as depicted in the following table:

| $k_j$ | a1 | a2 | a3 | a4 |
|---|---|---|---|---|
| $k_c$ | b1 = a1·a2 | | b2 = a3·a4 | |
| | c1 = b1·b2 | | | |

These combinations make it possible, just like the previously described example, to provide exponents $k_o$ which are a reflection of the common parts between the exponents $k_j^o$.

In order to simplify, the exponents $k_j$ are named $a_1, a_2, a_3, a_4$.

The exponents $k_c$ are named, at level −1 of the tree, $b_1$ and $b_2$, and at level −2 of the tree, $c_1$.

The combinations $a_1.a_2$, $a_3.a_4$ are produced by a AND logic function.

The combinations are reiterated at each level of the tree thus formed. The number of multiplications decreases on going further down into the tree because of the simple statistical distribution of the bits. The calculation effort to be made is reduced by n/3 multilplications.

As described previously, quantities $G_{ko}$ are determined at each level.

In this way there are obtained:

$$G_{a1} = g^{a1 \oplus b1} \bmod p$$

$$G_{a2} = g^{a2 \oplus b1} \bmod p$$

$$G_{b1} = g^{b1} \bmod p$$

$$G_{b1} = g^{b1 \oplus c1} \bmod p \text{ i.e. } G_{b1} = G_{b1} \cdot G_{c1} \bmod p$$

$$G_{b2} = g^{b2 \oplus c1} \bmod p \text{ i.e. } G_{b2} = G_{b2} \cdot G_{c1} \bmod p$$

$$G_{c1} = g^{c1} \bmod p$$

$$G^{a1} \bmod p = G_{a1} \times G_{b1} \bmod p = G_{a1} \times G_{b1} \times G_{c1} \bmod p$$

In practice, $g^{a1} \bmod p$ will be obtained by the product $G_{n1} \times G_{b1} \bmod p$ and $g^{a2} \bmod p$ will be obtained by the product $G_{a2} \times G_{b1} \times G_{c1} \bmod p$.

According to a second embodiment, the exponents are combined so as to form all the subsets of possible combination so that, for example if there is the exponent $k_j$: a, b, c, the combinations ab, ac, bc, abc will be formed.

Combinations will therefore be made which make it possible to define the common parts relating to these subsets by performing a AND logic function between a and b, a and c, b and c and a, b, c. In this way an exponent $k_c$ is defined for each subset obtained.

It is possible to calculate in parallel all the quantities $G_{kc} = k^{kc} \bmod p$ for which $k_c$ has few bits at 1 compared with the initial k values and therefore for which the modular calculation is rapid.

Then another type of combination is effected consisting of eliminating the common parts between an exponent and the previous combinations.

These combinations are produced by means of exclusive-OR logic functions. Thus, according to the given example, there are obtained:

$ka = a \text{ xor } abc \text{ xor } ac \text{ xor } ab$ $kb = b \text{ xor } abc \text{ xor } ab \text{ xor } bc$ $kc = c \text{ xor } abc \text{ xor } ac \text{ xor } bc$ It is then possible to calculate the quantities $G_{kj} = g^{kj} \bmod p$ for which the $k'_j$ values have still fewer bits at 1 than the initial $k_c$ value and for which the modular modifications are even more rapid.

To finish, the expressions $g^{kj} \bmod p$ are obtained by $k_j$.

In the case of the generation of N signatures obtained by this second embodiment, the calculation effort will tend towards $n/N$ squares $+ n(2^N - 1)/N2^N + (2_{N-1} - 1)$ multiplications.

The following table gives results of comparisons with the known methods such as square-multiply, square-multiply in parallel and the invention.

| | Methods | | |
|---|---|---|---|
| Effort time | Square-multiply | Parallel square-multiply | Combination of exponent binary tree |
| Square | N (n − 1) | n − 1 | n − 1 |
| multiplication | N (n/2 − 1) | N (n/2 − 1) | Nn/3 |
| Total | N (3n/2 − 2) | N (n/2 − 1) + n − 1 | Nn/3 + n − 1 |
| Effort for N>>n | 100% | 33% | 22% |

The first given embodiment (tree grouping) in the case of application to the generation of N signatures is inexpensive in memory space.

For a four-exponent binary tree, 8 registers of $\log_2(p)$ bits will be required for the calculations.

The second given embodiment (N groupings) is very inexpensive in calculation time since it is optimum in number of multiplications. For 3 exponents, 8 registers of $\log_2(p)$ bits will be required for the calculations.

What is claimed is:

1. A public-key cryptography method based on the discrete logarithm using the calculation of the quantity $g^k \bmod p$ where p is a prime number referred to as the modulus, k a random number normally of length n bits and g an integer referred to as the base, in which an entity E performs authentication and/or signature and/or encoding operations, comprising exchanges of signals with another entity in which this quantity acts, characterised in that it includes the following steps for the entity:

generating a random exponent k of length N bits, N being equal to n+b bits, calculating the Hamming weighting C of this exponent and comparing it with a value h fixed in advance, checking whether the random value k fulfils the condition $C \geq h$ rejecting the random value k where the Hamming weighting is less than h and recommencing the generation of new exponents until an exponent satisfying this condition is obtained, or keeping this value in the contrary case, calculating the expression $g^k \bmod p$ from the kept value, using this expression in the exchanges of electronic signals with the other entity.

2. A method according to claim 1, characterised in that the condition to be fulfilled is c=h.

3. A public-key cryptography method based on the discrete logarithm using the calculation of the quantity $g^k \bmod p$ where p is a prime number referred to as the modulus, k a random number normally of length n bits and g an integer referred to as the base, in which an entity E performs authentication and/or signature and/or encoding operations, comprising exchanges of signals with another entity in which this quantity acts, characterised in that it includes the following steps:

generating a set of random exponents $k_j$ of n bits of weighting $a_i$ expressed by the expression:

$$k_j = \Sigma a_i 2^i$$

calculating in parallel the powers of $g^{2^i}$ whilst combining the exponents so that the powers of g already calculated for an exponent serve for other exponents in which they act, for each given $k_j$, calculating the powers of g not yet calculated and grouping together all these powers in order to obtain the required expression $gk_j \bmod p$, using these expressions in an exchange of signals with the other entity.

4. A method according to claim 3, characterised in that:

parallel-calculation and grouping-together steps include the following operations:

combining the exponents in pairs in order to obtain exponents $k_c$ which are a reflection of their common parts and reiterating the combinations on the combination result obtained, calculating the quantities $G_{k_c}$ for each value of $k_c$ such that:

$$G_{k_c} = g^{k_c} \bmod p$$

combining an exponent $k_j$ with the exponent $k_c$ obtained for the combination to which this exponent belongs so as to eliminate the common parts and keep only the different parts, defining exponents $k'_j$ which are a reflection of the different parts between a given exponent $k_j$ and a given exponent $k_c$, calculating quantities $G_{k_j}$ such that :

$$G_{k_j} = g^{k_j} \bmod p$$

determining the expressions $G_{k_j} \bmod p$ by performing multiplications between the quantities $G_{k_c}$ obtained at each iteration.

5. A method according to claim 3, characterised in that parallel-calculation and grouping-together steps include the following operations:

combining the exponents together so as to form all the subsets of possible combinations of exponents having common parts, defining exponents $k_c$ which are a reflection of the common parts, for each subset of combinations such that the non-nil bits of given weighting correspond to the non-nil bits of the same weighting of the combination under consideration, calculating quantities $G_{k_c}$ for each value of $k_c$ such that: $G_{k_c} = g^{k_c} \bmod p$ combining each exponent $k_j$ with all the exponents $k_c$ obtained for each subset of combinations to which this exponent $k_j$ belongs so as to eliminate the common parts and keep only the different parts, defining exponents $k'_j$ which are a reflection of different parts between a given exponent $k_j$ and a given exponent $k_c$, calculating quantities $G_{k_j}$ such that:

$$G_{k_j} = g^{k_j} \bmod p$$

determining the expressions $g^{k_j} \bmod p$ by performing a multiplication between the quantities $G'_{k_j}$ and $G_{k_o}$ for each $k_j$.

* * * * *